Dec. 23, 1969 W. D. BEHLMER 3,485,063
TORSIONAL ISOLATOR COUPLING
Filed March 15, 1968
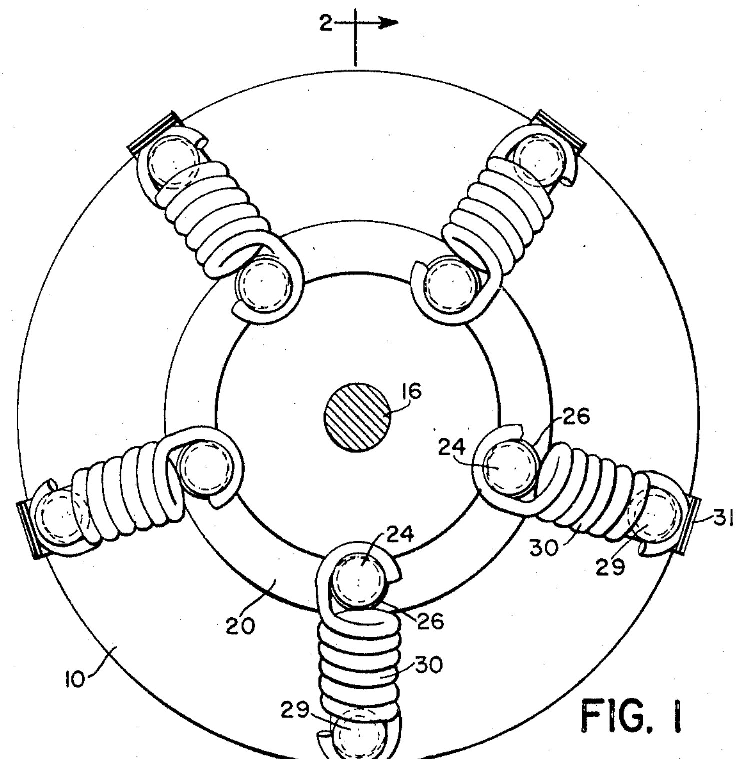
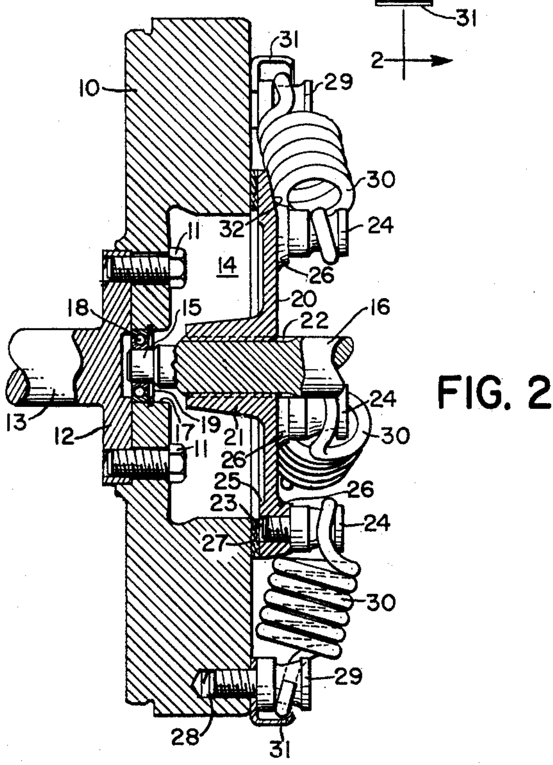
*INVENTOR.*
WILBUR DALE BEHLMER
*BY* R L Hollister
AGENT United States Patent Office 3,485,063

Patented Dec. 23, 1969

3,485,063

TORSIONAL ISOLATOR COUPLING

Wilbur Dale Behlmer, Dubuque, Iowa, assignor to Deere & Company, Moline, Ill., a corporation of Delaware Filed Mar. 15, 1968, Ser. No. 713,457
Int. Cl. F16d *3/14*
U.S. Cl. 64—27 7 Claims

ABSTRACT OF THE DISCLOSURE

A plurality of tension springs are assembled radially between outer spring anchors spaced about an engine flywheel and inner spring anchors similarly spaced about a driven disk which is smaller than the flywheel and which drives a transmission input shaft. The springs will rotate the disk with the flywheel, but will prevent the major torsional vibrations from being transmitted from the flywheel to the disk. A friction member is bonded to the driven disk and acts on the flywheel to provide dampening and alleviate resonance. The springs are positioned at an angle axially from a true radial plane such that a component of the spring force acts compressively on the friction member.

BACKGROUND OF THE INVENTION

The present invention relates to a torque transmitting coupling which is ideally suited for use between an engine flywheel and the input shaft for a transmission. More particularly, the invention relates to such a coupling which will isolate the major torsional vibrations present in the flywheel from the transmission input shaft over a wide range of frequencies and torque.

In the operation of an internal-combustion engine, the engine is subjected to an interrupted but concentrated force which is brought about by the movement or exciting action of the several pistons and connecting rods operatively connected to the crankshaft. The continuous application of the interrupted force on the crankshaft results in torsional vibrations which are not only present in the crankshaft, but are passed on to all the components driven by the engine. To isolate the torsional vibrations present in the engine crankshaft, it is customary to mount a weighted inertia member or flywheel on the engine crankshaft. The flywheel will absorb and store a portion of the force brought about by the exciting action of the pistons and in the periods of interruption will transfer the stored force back to the crankshaft. By transmitting the stored force back to the crankshaft, the flywheel isolates the torsional vibrations to the extent that the internal-combustion engine will operate with acceptable efficiency. However, the torsional vibrations are only partially isolated and are still transmitted to the various components driven by the internal-combustion engine.

In an attempt to isolate the vibrations remaining in the crankshaft and flywheel from the transmission, it has heretofore been proposed to form a clutch plate with two disks, each disk having spring seats struck therefrom toward the other disk, and circumferentially spaced coil springs compressively mounted intermediate the seats between the two disks. The circumferentially spaced springs were to allow a small amount of relative angular displacement between the two disks so that the torsional vibrations picked up by one of the disks from the engine crankshaft or flywheel would be absorbed by the springs and not passed on to the other disk.

The clutch plate torsional isolator design heretofore proposed could be successfully employed in a system which has limited isolation requirements (angular displacement and spring rate) compatible with the maximum torque requirements since the spring rate could be chosen to provide the required isolation and torque capacity yet have a natural frequency which would not correspond to the frequency of imposed torsional vibrations within the operating range of the engine. However, as a practical matter, the operating r.p.m. and torque requirements or load on an internal-combustion engine, for example, the engine in a motor vehicle, are constantly varied over a wide range. If the spring rate in the clutch plate torsional isolator were chosen to correspond to the isolation requirements, torque capacity may be insufficient, and, in some operating conditions, the natural frequency of the isolator and system would likely correspond to the frequency of the engine torsional vibrations, resulting in resonance. Isolation requirements often require a low torsional spring rate which will not provide required isolator torque capacity.

SUMMARY OF THE INVENTION

A general object of the present invention is to provide an improved torsional vibration isolator.

Another object of the present invention is to provide a torque transmitting coupling which will isolate torsional vibrations over a wide range of frequencies and torque.

Still another object of the present invention is to provide a torque transmitting coupling which will isolate torsional vibrations and which is automatically self-adjusting in response to variations in torque load.

Yet another object of the present invention is to provide a torque transmitting coupling which will initially provide maximum torsional vibration isolation which rapidly and smoothly decreases to provide a rapidly increasing torque transmitting capacity.

A further object of the present invention is to provide a torque transmitting coupling which, when mounted between an internal-combustion engine and a transmission, will prevent the major torsional vibrations present in the engine crankshaft from being transmitted to the transmission.

A still further object of the present invention is to provide a torque transmitting coupling which isolates torsional vibrations and which also provides control of resonance by dissipation of energy.

The above objects are accomplished by assembling a plurality of tension springs radially between outer spring anchors spaced about the outer edge of an engine flywheel and inner spring anchors spaced about the outer edge of a driven disk which is of smaller diameter than the flywheel and which drives the transmission input shaft. In an unloaded condition this assembly has no torque capacity except that provided by friction since the spring force directed through the center or axis of rotation has no moment. As load is applied, the outer spring anchors will initially be displaced circumferentially from the inner spring anchors, thereby providing a lever arm through which the springs can act and hence a spring force moment. The initial outer to inner spring anchor displacement causes little increase in spring tension. Therefore, a low torsional rate is provided as required for isolation of vibrations. With further outer to inner anchor displacement, both spring load and lever arm increase, providing a rapidly accelerating torsional rate up to maximum torque capacity in the isolator. To alleviate resonance which may be set up when the frequency of vibrations in the flywheel is the same as the system natural frequency, a friction member is bonded to the driven disk and acts against the engine flywheel to provide dampening and dissipate a portion of the energy. By positioning the springs at an angle axially from a true radial plane, a component of the spring force will act compressively on the friction member and thereby insure attainment of the dampening required to alleviate resonance.

Other objects and the nature and advantages of the present invention will be apparent from the following description taken in conjunction with the accompanying drawings.

BRIEF DESCRIPTION OF THE DRAWINGS

In the drawings:

FIG. 1 is an elevational view of a torsional isolator constructed in accordance with the principles of the present invention; and FIG. 2 is a sectional view taken substantially along the line 2—2 of FIG. 1, looking in the direction of the arrows.

DESCRIPTION OF THE PREFERRED EMBODIMENT

Referring to the drawings, a flywheel 10 is illustrated as being secured by cap screws 11 to a flange 12 which is integral with the rear end portion of an engine crankshaft 13. The headed ends of the cap screws 11 are located in a central recess 14 provided in the flywheel 10 so that they do not project beyond the rear face of the flywheel. The forward reduced end 15 of a transmission input shaft 16 extends into an opening 17 along the axis of rotation of the flywheel and is journaled therein by a bearing 18. The bearing 18 is maintained in position within the opening 17 by the flange 12 and a snap ring 19. The bearing 18 serves to keep the transmission input shaft in alignment with the crankshaft 13.

A disk or plate-like member 20 is provided with a central hub portion 21 and is mounted on the transmission input shaft 16 and held in non-rotatable relation therewith by splines 22. The plate-like member 20 is provided with a plurality of circumferentially spaced tapped holes 23 adjacent the outer periphery thereof. Each of the tapped holes 23 is spaced an equal angular distance from each of the two adjacent tapped holes, and each extends completely through the plate-like member 20. Each of the tapped holes 23 threadedly receives an inner spring anchor 24. To provide a sufficient support for the spring anchors 24, the side of the plate-like member 20 which faces the flywheel is provided with an annular flange 25 adjacent the outer periphery in the area of the tapped holes 23, and the other side is provided with a plurality of circumferentially spaced bosses 26 adjacent the outer periphery. Each of the tapped holes 23 extends through one of the bosses 26 and through the flange 25. A friction disk 27 is bonded to the plate-like member 20 on the annular flange 25 and engages a finished surface on the flywheel 10 to resist any relative rotation between the flywheel 10 and plate-like member 20.

A plurality of circumferentially spaced tapped holes 28 are provided in the flywheel 10 adjacent the outer periphery thereof, and each is spaced an equal angular distance from the two adjacent tapped holes. The number of tapped holes 28 in the flywheel 10 is equal to the number of tapped holes 23 in the plate-like member 20. Each of the tapped holes 28 threadedly receives an outer spring anchor 29. A plurality of springs 30 are tensioned between the inner spring anchors 24 and the outer spring anchors 29, with one end of each spring 30 engaged around one of the inner spring anchors 24 and the other end of each spring 30 engaged around a corresponding one of the outer spring anchors 29. The force of the springs 30 will have a tendency to keep the inner spring anchors 24 radially aligned with the outer spring anchors 29 as illustrated in FIG. 1. To prevent centrifugal force from freeing the springs 30 from the outer spring anchors 29 during high speeds of rotation, each outer spring anchor 29 is provided with a spring retaining clip 31. The necessity of the clips 31 is dependent on the initial tensioning of the springs 30 and upon the speed at which the flywheel will be rotated.

The springs 30 are also utilized to provide a compressive force on the friction disk 27. This is accomplished by axially offsetting the inner spring anchors 24 from the outer spring anchors 29. With the spring anchors thus positioned, a component of the spring force will urge the plate-like member 20 axially toward the flywheel 10 and bias the friction disk 27 against the finished surface on the flywheel 10. The outer edge of the side of the plate 20 facing away from the flywheel 10 is beveled as at 32 so that the plate 20 will not interfere with the springs 30 when the outer spring anchors 29 are circumferentially displaced from the inner spring anchors 24.

To provide a maximum length of contact between the springs 30 and the spring anchors, the inner spring anchors 24 include a conical spring seat and the outer spring anchors 29 include an inverted conical spring seat. Since the inner spring anchors 24 are axially offset from the outer spring anchors 29, the spring force will urge the ends of the springs toward the larger end of the conical seats.

The above-described torsional vibration isolating coupling will operate as follows. In the unloaded condition, where there is no load on the transmission input shaft 16 and substantially no resistance to its rotation, the plate-like member 20 will assume a substantially neutral position with respect to the flywheel 10 as shown in FIGURE 1. When the plate-like member 20 is in the neutral position, the coupling has no torque capacity except that provided by friction since the spring force will act directly through the axis of rotation and hence will have no lever arm. As load is initially applied to the transmission input shaft 16, the outer spring anchors 29 will be circumferentially displaced from the inner spring anchors 24 providing a spring force moment which increases with applied load. The spring force moment now present is due mainly to the growth of the lever arm since the initial displacement of the outer spring anchors 29 from the inner spring anchors 24 will provide little increase in spring tension. Since there is only a small increase in the spring tension at this time, the coupling still has a high torsional vibration isolation capacity. Since the spring rate is still relatively low, the springs will be able to absorb most of the torsional vibrations without transmitting them on to the plate-like member 20.

Additional load on the transmission input shaft 16 will cause further outer to inner spring anchor displacement resulting in an increase in both the spring tension and the lever arm. With both the spring tension and lever arm increasing, the torque transmitting capability of the coupling will rapidly accelerate up to maximum torque capacity. As the spring tension increases up to the maximum spring rate, the ability of the springs to absorb the torsional vibrations from the flywheel 10 decreases and a portion of the vibrations is passed through the springs to the plate-like member 20. Since any vibrations passed on to the plate-like member 20 are transmitted through the spring system, a resonance may be set up when the frequency of the vibrations in the flywheel is equal to the system natural frequency. However, the friction disk 27 will resist relative rotation between the flywheel 10 and the plate-like member 20 a sufficient amount to dissipate a portion of the energy and thereby alleviate resonance.

If the coupling is to be used in a system in which occasional high torque peaks occur which will load the springs in excess of their endurance limits stops may be incorporated between the flywheel 10 and plate-like member 20 to limit the relative displacement of the two parts.

While a single preferred embodiment of the present invention has been described, various changes and modifications within the spirit and scope of the invention will become apparent to those skilled in the art. Therefore, the invention should not be limited by the foregoing detailed description but only by the following claims.

I claim:

1. A torsional vibration isolator coupling comprising a driving member and a driven member, said members being mounted adjacent one another for rotation on a common axis, a plurality of spring means normally positioned substantially radially with respect to the axis of rotation, each of said spring means being anchored to both said driving member and said driven member and tensioned therebetween whereby when said driving member is displaced about said axis of rotation with respect to said driven member and one end of each of said spring means is circumferentially displaced from the other end, said spring means will urge said driven member to follow said driving member, the points of attachment of said plurality of spring means to said driving member being axially spaced from the points of attachment to said driven member whereby said plurality of spring means are positioned at an angle axially from a true radial plane such that a component of the spring force is axially directed and urges said members toward one another.

2. The device as set forth in claim 1 wherein a friction means is mounted on a surface of one of said members which faces the other of said members and is normally biased against the other of said members by the axially directed force of said plurality of spring means whereby said friction means resists relative rotary movement between said members.

3. The device as set forth in claim 2 wherein said friction means consists of an annular-shaped disk of friction material and is bonded to said driven member.

4. The device as set forth in claim 3 wherein said driving member is secured to an input shaft and said driven member is non-rotatably mounted on an output shaft, said output shaft extending through said driven member and having an end portion journaled in said driving member whereby said shafts are maintained in substantial alignment and said output shaft maintains said driven member centered on the axis of rotation of said driving member.

5. A torsional vibration isolator coupling comprising a circular-shaped driving member mounted for rotation about a fixed axis and having a substantially planar face positioned radially with respect to the axis of rotation, a plurality of outer spring anchors circumferentially spaced about said face adjacent the outer edge thereof and forming an outer spring anchor circle, a plate-shaped driven member adjacent the planar face of said driving member, said driven member being of a size to fit within said outer spring anchor circle, a plurality of inner spring anchors circumferentially spaced about one side of said driven member adjacent the outer edge thereof and forming an inner spring anchor circle, said inner spring anchors being axially displaced from said outer spring anchors and provided on the side of said driven member which faces away from said driving member, a plurality of substantially radially positioned spring means tensioned between said members with each of said spring means having one end portion secured to an outer spring anchor and the opposite end portion secured to a corresponding inner spring anchor whereby the rotation of said driving member will be transmitted to said driven member through said spring means and said spring means are positioned at an acute angle axially from a true radial plane such that a component of the spring force acts compressively on said driving and driven members.

6. The device as set forth in claim 5 wherein each of said outer spring anchors and each of said inner spring anchors are circumferentially displaced an equal angular distance from each of the two adjacent outer spring anchors and each of the two adjacent inner spring anchors, respectively, and said plurality of spring means are substantially identical to one another whereby said spring means will maintain said driven member in a substantially centered position with respect to said driven member for rotation about a common axis.

7. The device as set forth in claim 5 wherein a friction disk is mounted on one of said driving and driven members and acts against the other of said members to resist relative rotation between said members.

References Cited

UNITED STATES PATENTS

| | | | |
|---|---|---|---|
| 1,976,505 | 10/1934 | Mallina | 64—27 |
| 1,990,683 | 2/1935 | Wood | 64—27 |
| 3,013,413 | 12/1961 | Luning | 64—27 |

FOREIGN PATENTS

| | | |
|---|---|---|
| 768,634 | 5/1934 | France. |

HALL C. COE, Primary Examiner

U.S. Cl. X.R.

74—574